United States Patent
Eda et al.

(10) Patent No.: US 11,641,394 B2
(45) Date of Patent: *May 2, 2023

(54) CLONE EFFICIENCY IN A HYBRID STORAGE CLOUD ENVIRONMENT

(71) Applicant: International Business Machines Corporation, Armonk, NY (US)

(72) Inventors: Sasikanth Eda, Vijayawada (IN); Deepak R. Ghuge, Sangamner (IN); Yu-Cheng Hsu, Tucson, AZ (US); Sandeep R. Patil, Pune (IN)

(73) Assignee: International Business Machines Corporation, Armonk, NY (US)

( * ) Notice: Subject to any disclaimer, the term of this patent is extended or adjusted under 35 U.S.C. 154(b) by 851 days.

This patent is subject to a terminal disclaimer.

(21) Appl. No.: 16/376,103

(22) Filed: Apr. 5, 2019

(65) Prior Publication Data

US 2019/0230160 A1 Jul. 25, 2019

Related U.S. Application Data

(63) Continuation of application No. 14/738,031, filed on Jun. 12, 2015, now Pat. No. 10,305,979.

(51) Int. Cl.
*H04L 67/1095* (2022.01)
*G06F 3/06* (2006.01)
(Continued)

(52) U.S. Cl.
CPC ........ *H04L 67/1095* (2013.01); *G06F 3/0601* (2013.01); *G06F 3/061* (2013.01); *G06F 3/065* (2013.01); *G06F 3/067* (2013.01); *G06F 3/0676* (2013.01); *H04L 67/10* (2013.01); *H04L 67/1097* (2013.01); *H04L 67/125* (2013.01); *H04L 67/53* (2022.05)

(58) Field of Classification Search
CPC ........ G06F 3/0601; G06F 3/061; G06F 3/065; G06F 3/067; G06F 3/0676
See application file for complete search history.

(56) References Cited

U.S. PATENT DOCUMENTS

| 8,112,603 | B2* | 2/2012 | Dow ..................... G06F 3/0676 |
| | | | 711/170 |
| 8,832,410 | B2* | 9/2014 | Springberg ........... G06F 3/0676 |
| | | | 711/112 |

(Continued)

OTHER PUBLICATIONS

"macperformanceguide.com: Why You Need More Space Than You You Need". Last updated Dec. 1, 2010. Five pages. https://macperformanceguide.com/Storage-WhyYouNeedMoreThanYouNeed.html.

(Continued)

*Primary Examiner* — Uzma Alam
(74) *Attorney, Agent, or Firm* — Stephen R. Yoder

(57) ABSTRACT

An efficient cloning mechanism is provided for a distributed storage environment, where, for example, a private cloud computing environment and a public cloud computing environment are included in a hybrid cloud computing environment (on-premise object storage to off-premise computation resources), to improve computation workloads. The disclosed algorithm forms an efficient cloning mechanism in a hybrid storage environment where the read/write speed of data from the disk is not limited by its angular velocity.

10 Claims, 8 Drawing Sheets

(51) Int. Cl.
  *H04L 67/1097* (2022.01)
  *H04L 67/10* (2022.01)
  *H04L 67/125* (2022.01)
  *H04L 67/53* (2022.01)

(56) References Cited

U.S. PATENT DOCUMENTS

| | | | |
|---|---|---|---|
| 8,976,636 B1* | 3/2015 | Martin | G06F 3/0644 |
| | | | 369/30.01 |
| 10,917,470 B1* | 2/2021 | Zhuravlev | G06F 9/45558 |
| 2005/0080990 A1* | 4/2005 | Mereddy | G06F 3/0659 |
| | | | 711/114 |
| 2008/0183973 A1 | 7/2008 | Aguilera | |
| 2009/0113160 A1* | 4/2009 | Ferraro | G06F 3/0676 |
| | | | 711/170 |
| 2013/0060919 A1 | 3/2013 | Khandekar | |
| 2014/0156851 A1 | 6/2014 | Suami | |
| 2014/0258533 A1 | 9/2014 | Antony | |
| 2015/0052218 A1* | 2/2015 | Zhang | H04L 67/10 |
| | | | 709/217 |
| 2016/0285918 A1* | 9/2016 | Peretz | G06F 16/285 |
| 2022/0291840 A1* | 9/2022 | Bhide | G06F 3/065 |

OTHER PUBLICATIONS

"What is Hybrid Cloud?" Internet Archive Wayback Machine Dated Feb. 9, 2015. One page. http://www.interoute.com/cloud-article/what-hybrid-cloud.

Appendix P List of IBM Patents or Applications Treated as Related. Dated: Apr. 5, 2019. Two pages.

Hurwiiz, et al. "What is Hybrid Cloud Computing?" Internet Archive Wayback Machine. Feb. 14, 2015. One page.http://www.dummies.com/how-to/content/what-is-hybrid-cloud-computing.html.

Mell et al. "The NIST Definition of Cloud Computing" National Institute of Standards and Technology. U.S. Department of Commerce. Special Publication 800-145. Gaithersburg, MD. Sep. 2011. Seven pages.

\* cited by examiner

CLONE EFFICIENCY IN A HYBRID STORAGE CLOUD ENVIRONMENT

BACKGROUND

The present invention relates generally to the field of distributed computer resources, and more particularly to cloning efficiency between distributed storage environments.

Computation efficiency is improved by modifying the cloning mechanism in a distributed storage environment, such as found in a hybrid computing system environment (hybrid cloud). According to the definition, a hybrid cloud can be defined as a combination of a private computing system environment (private cloud) combined with the use of the public services of a public computing system environment (public cloud) where one or several touch points exist between the computing environments. The goal of a hybrid cloud is to combine services and data from a variety of cloud models to create a unified, automated, and well-managed distributed computing system environment.

A distributed computing system environment is referred to as "hybrid" if it satisfies the following requirements: (i) a company uses a public development platform that sends data to a private cloud or to a data center based application; (ii) when a company leverages a number of SaaS (software as a service) applications and migrates data between private cloud or data center resources; and (iii) when a business process is designed as a service so that it can connect with multiple computing system environments as though they were a single computing system environment.

A distributed computing environment is not referred to as "hybrid" if it falls into the following categories: (i) a few developers in a company use a public cloud service to prototype a new application that is completely disconnected from the private cloud or the data center; and/or (ii) a company is using a SaaS application for a project, but there is no movement of data from that application into the company's data center.

Hard drives are fastest on the outer area of the drive because they use a constant data density. Because the outer area of the drive is about twice the circumference of the inner area, twice the data passes under the drive head in the outer area than in the inner area with each rotation of the platter.

This difference in speed suggests that improved performance is available where the most important and/or frequently-accessed data is placed in the outer area, or outer partition, of the platter. That is, the seek time and the data transfer rates are each improved.

Shingled magnetic recording (SMR) is a magnetic storage data recording technology used in hard disk drives (HDDs) to increase storage density and overall per-drive storage capacity. Some hard disk drives record data by writing non-overlapping magnetic tracks parallel to each other, while SMR writes new tracks that overlap part of the previously written magnetic track, leaving the previous track thinner and allowing for higher track density.

SUMMARY

According to an aspect of the present invention, there is a computer program product and system for improving the clone efficiency between a public cloud environment and a private cloud environment of a hybrid cloud computing environment by leveraging the speed variations between inner partitioned tracks of a storage disk and outer partitioned tracks of the storage disk of the private cloud environment that performs the following steps (not necessarily in the following order): (i) receiving a request for a clone operation for a target data on a storage disk of a private cloud environment from the public cloud environment where the public cloud environment provides a computing resource for a processing operation performed by the hybrid cloud computing environment, (ii) identifying a current track location of the target data on the storage disk, and (iii) upon meeting a condition that the target data is located on the inner partitioned tracks of the storage disk, performing an internal alteration of the current track location of target data to a set of outer partitioned tracks of the storage disk prior to the cloning operation performed by the public cloud environment. The private cloud environment provides the storage disk for the processing operation performed by the hybrid cloud computing environment.

According to an aspect of the present invention, there is a computer program product and system for improving the clone efficiency in a hybrid cloud environment between a corresponding public cloud environment and a corresponding private cloud environment by leveraging the speed variations between an inner partitioned set of tracks of a storage disk and an outer partitioned set of tracks of the storage disk stored in the public cloud environment that performs the following steps (not necessarily in the following order): (i) receiving a request for a clone operation for a target data from the private cloud environment, the target data located in the public cloud environment where the public cloud environment provides the storage disk for a processing operation performed by the hybrid cloud computing environment, (ii) estimating an importance level of the target data by determining at least whether the target data includes intermittent data to be used by the compute resource for the processing operation of the private cloud environment where the private cloud environment provides the compute resource for the processing operation performed by the hybrid cloud computing environment, and (iii) determining whether to write the target data to the inner partitioned set of tracks or to the outer partitioned set of tracks of the storage disk based, at least in part, on the importance level of the target data with respect to the processing operation.

DETAILED DESCRIPTION

Figure 1:
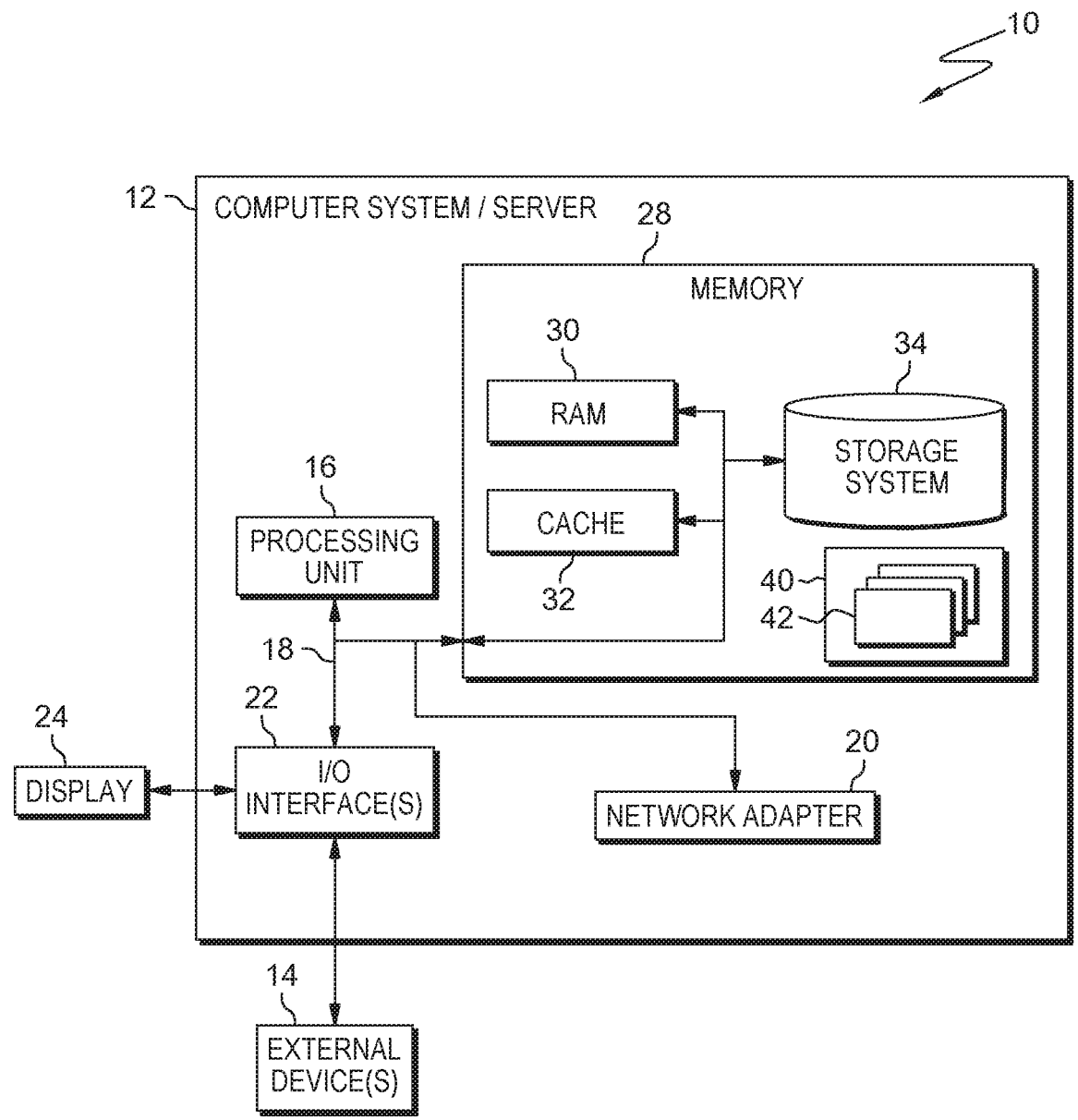
FIG. 1 depicts a cloud computing node used in a first embodiment of a system according to the present invention.

An efficient cloning mechanism is provided for a distributed storage environment, where, for example, a private cloud computing environment and a public cloud computing environment are included in a hybrid cloud computing environment (on-premise object storage to off-premise computation resources), to improve computation workloads. The disclosed algorithm forms an efficient cloning mechanism in a hybrid storage environment where the read/write speed of data from the disk is not limited by its angular velocity. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
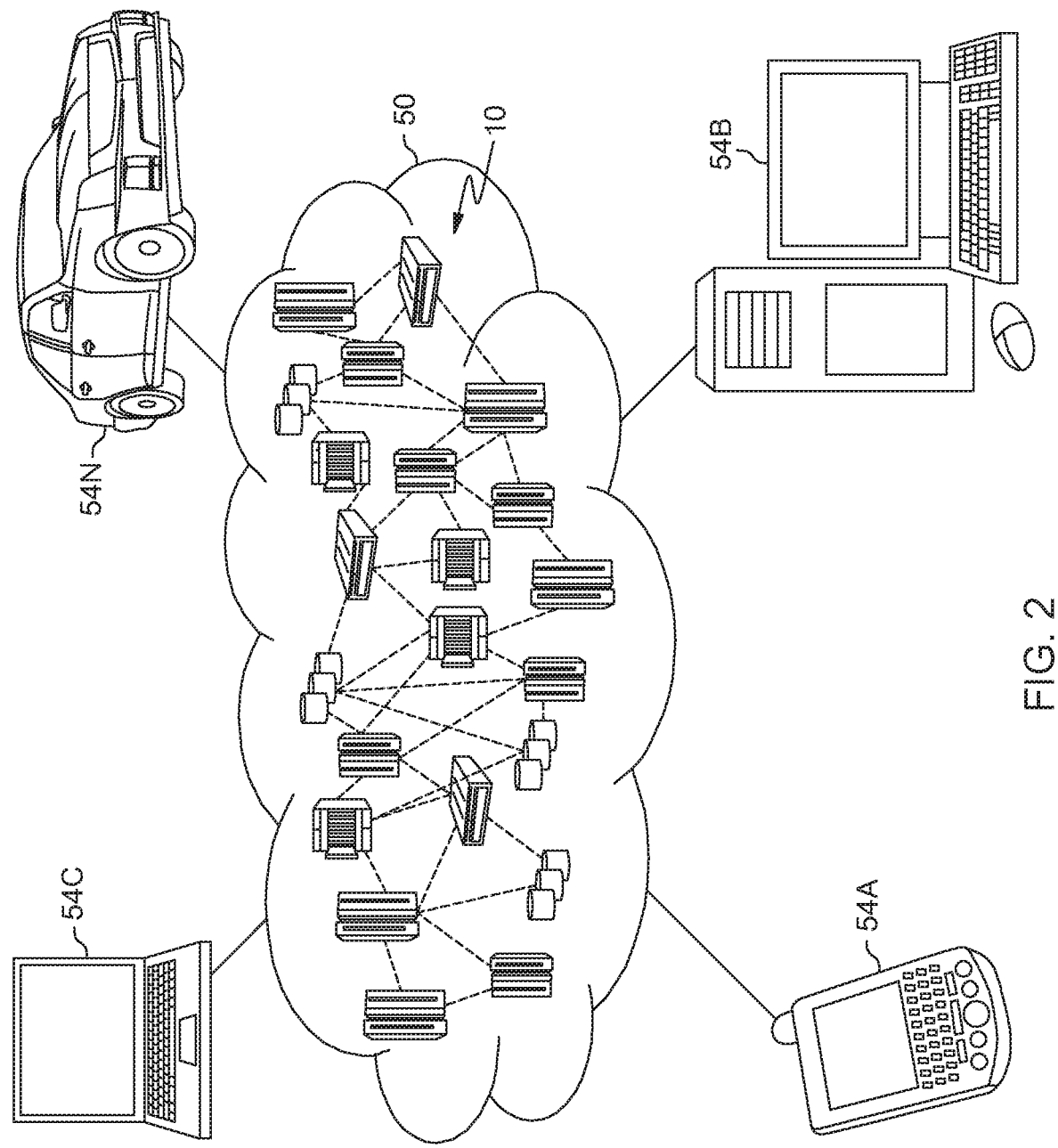
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
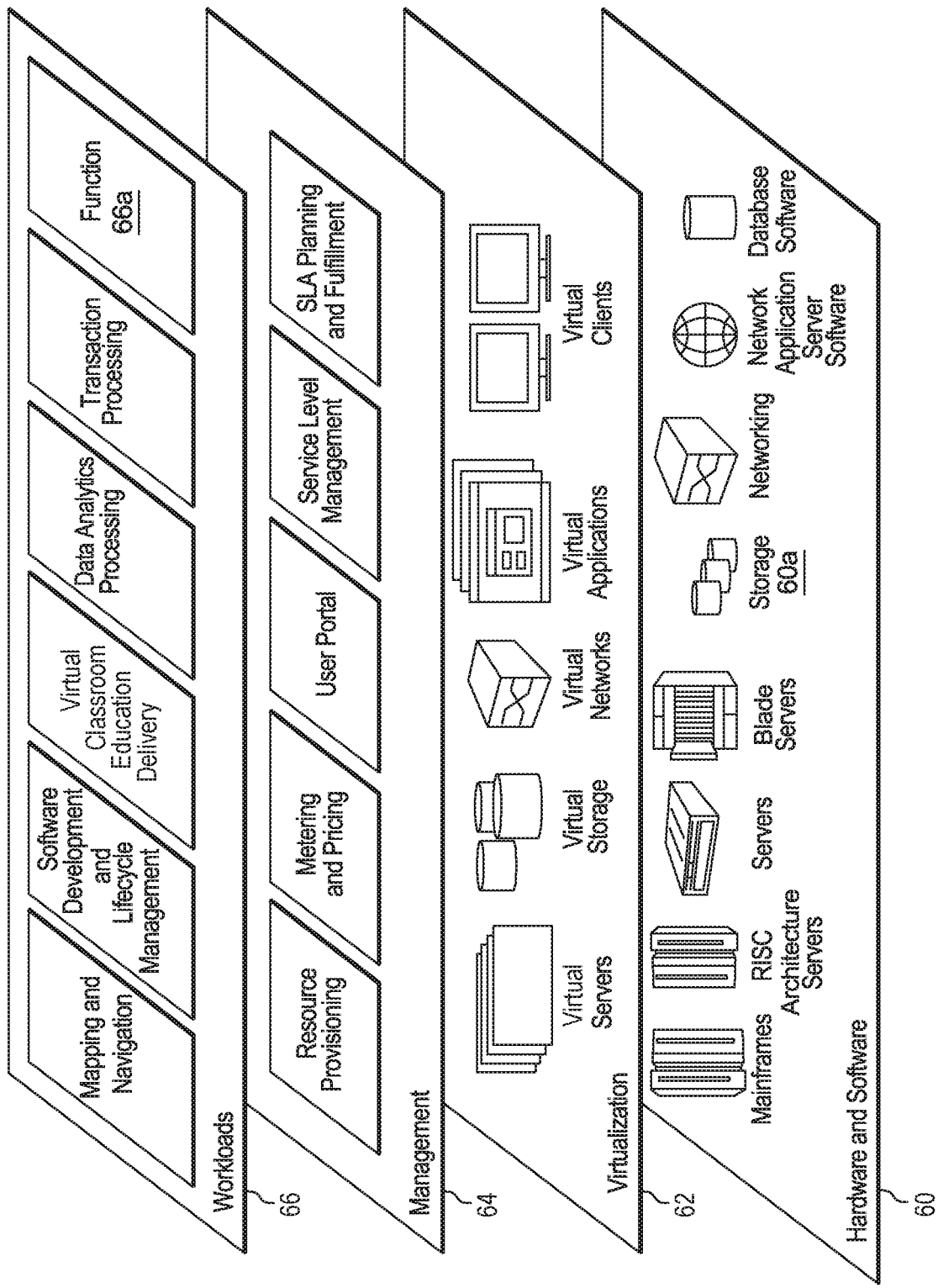
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
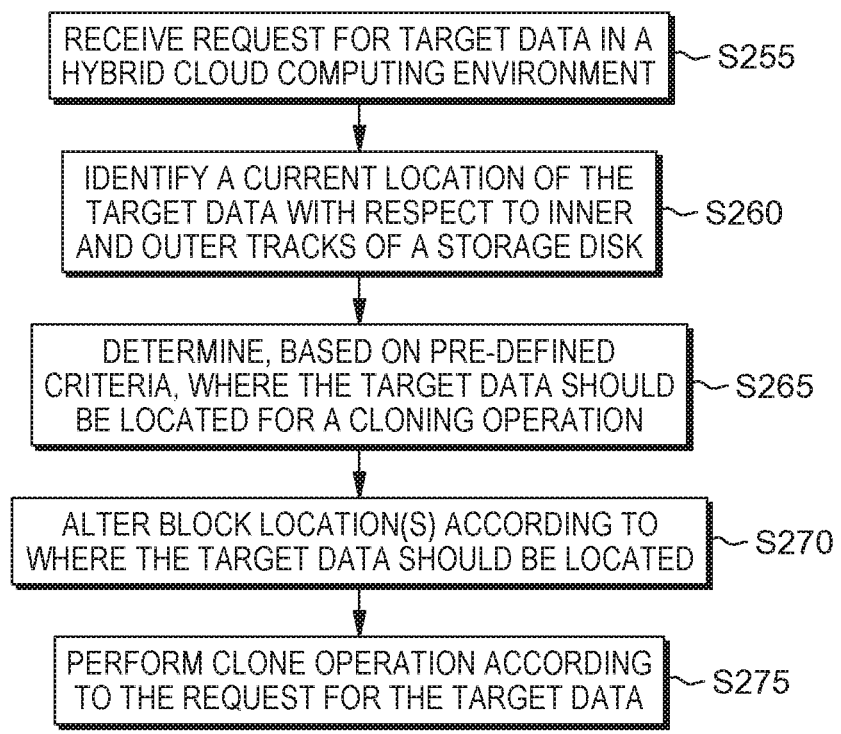
FIG. 4 is a flowchart showing a first embodiment method performed, at least in part, by the first embodiment system.
Figure 5:
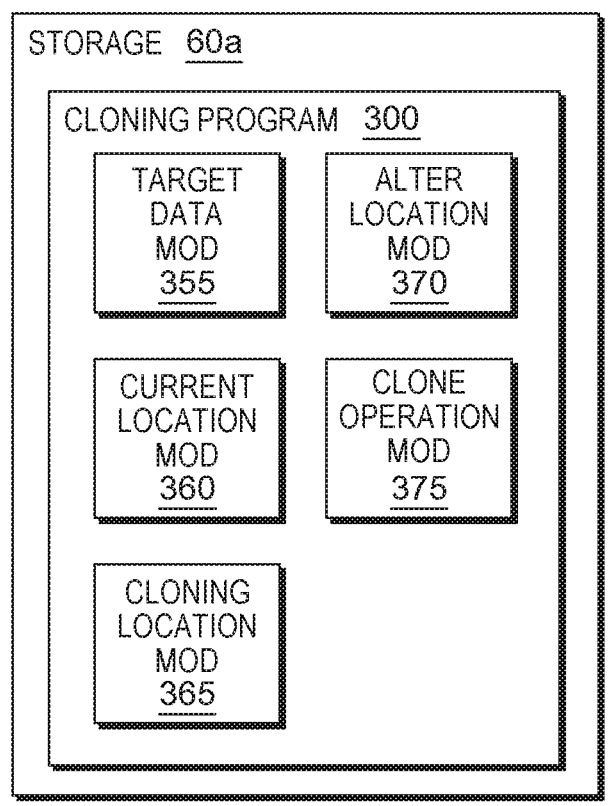
FIG. 5 is a block diagram showing a machine logic (for example, software) portion of the first embodiment system.

Some embodiments of the present invention are directed to an algorithm or method that facilitates an efficient cloning mechanism within a hybrid distributed storage environment, such as one including both private cloud and public cloud environments, to improve the computation workloads. FIG. 4 shows flowchart 250 depicting a method according to the present invention. FIG. 5 shows program 300 for performing at least some of the method steps of flowchart 250. This method and associated software will now be discussed, over the course of the following paragraphs, with extensive reference to FIG. 4 (for the method step blocks) and FIG. 5 (for the software blocks). One physical location where program 300 of FIG. 5 may be stored is in storage block 60a (see FIG. 3).

Processing begins at step S255, where target data module ("mod") 355 receives a request for target data in a hybrid distributed storage environment (e.g. hybrid cloud). In this example, the target data resides in the private cloud computing environment (private cloud) of the hybrid cloud. A data clone operation is triggered by the public cloud computing environment (public cloud). That is, data blocks of the public cloud needs to be replicated with blocks of the private cloud. Alternatively, the target data is already existing in the private cloud and a clone operation of the same data is requested by the public cloud. Alternatively, the data clone operation is triggered by the private cloud component of the hybrid cloud to target data residing in the public cloud component.

Processing proceeds to step S260, where current location mod 360 identifies a current location of the target data with respect to the inner and outer tracks, or zones, of a storage disk. In this example, the current location mod identifies whether the requested raw data, such as an image or virtual machine templates, are residing in inner tracks or outer tracks of the storage disks of the private cloud computing environment. One example of a storage disk is one based on shingled magnetic recording (SMR) technology. Other examples of storage disks are provided above, in the Hardware and Software Environment section.

Throughout this detailed description reference is made to the inner tracks and outer tracks of a data storage disk. These tracks are located in what is often referred to as the inner and outer zones of the disk. Conventional disk drives use zone bit recording such that the write speed is higher in the outer zone than in the inner zone. The specific boundary between the inner and outer zones should be considered arbitrary for the purposes of this disclosure. The described process takes advantage of the varied write speeds at the inner and outer zones for improved cloning operation efficiency.

Processing proceeds to step S265, where cloning location mod 365 determines, based on pre-defined criteria, where the target data should be located for a cloning operation. Having identified the location of the target data in step S260, a determination is made regarding possibly altering the current location of the data blocks. Various criteria influence the outcome of this determination. In this example, the determination includes: (i) calculation of the target data size; (ii) determination of the network speed; and (iii) the gain is calculated in terms of total time for the clone operation, the block location alteration(s), CPU (central processing unit) resource(s), and network resource(s). If the target data size is higher than average, it is a qualifying data size. If the gain, in terms of resources, is higher than average, it is a qualifying gain. Where a qualifying data size and/or a qualifying gain is determined, the target data is internally mapped to the outer tracks and served to the public cloud computing environment from the outer tracks of the storage disk.

Alternatively, demand for the target data is calculated to determine a demand criteria. That is, it is determined whether the demand for the clone-based data is readily required or is likely needed after some period of time. According to the outcome of this demand criteria, the block location(s) may be altered, or moved, from the outer tracks to the inner tracks of the storage disk. As stated above, the outer disk represents the location of data that is needed more quickly and should be readily available.

Alternatively, the importance of the target data is estimated. The importance refers whether the target data is important, processed results, or intermittent data of the computation engine or whether the target data is non-important and/or demands a non-term storage. If important, the target data is determined to be directly cloned to the outer tracks of the disk residing at the on-premise location, or private cloud. If non-important, the target data is determined to be directly written to inner tracks of the disk residing at the off-premise location, or public cloud.

Alternatively, if the target data content is an image, such as an operating system or ISO, along with a separated data partition, or a separate disk, or volume, the determination may be to segregate the image file from the data volume, writing the image file to the inner tracks and the data volume to the outer tracks. In some embodiments of the present invention, this determination is made based on a defined quality of service (QoS) pattern.

Processing proceeds to step S270, where alter location mod 370 alters the block location(s) of the target data according to where the target data should be located. Upon determining, in step S265, where the target data should be located, the alter location mod takes the appropriate action to alter location(s) of the data blocks.

Processing ends with step S275, where clone operation mod 375 performs the clone operation according to the request for the target data, received in step S265.

III. Further Comments and/or Embodiments

Having the above background understanding and assuming an example hybrid distributed storage environment scenario where, in a private cloud computing environment (private cloud), an organization uses object storage for storing long term images, VM (virtual machine) templates, and/or processed information. Further, the organization has chosen a public cloud computing environment (public cloud) for its computation and/or analytics workload. This example scenario illustrates that the organization on-premise (private) infrastructure is rich in terms of storage and network, whereas it relies on off-premise (public) for computation purposes. Because the on-premise infrastructure is storage rich, the organization is not interested in purchasing storage from a public cloud computing environment (it can simply purchase computation resources with a bare minimum storage).

In this kind of hybrid cloud computing environment, raw data (images, VM templates, unstructured data, and structured data) flows from on-premise storage to off-premise computation. Assuming further, for example, that a situation arises where the off-premise computation workload requires an image that is stored on the inner disk tracks of on-premise object storage (slow speed). In this example, a cloning operation is triggered over the image resulting in the cloning operation taking more time to complete than necessary, even if the network bandwidth is large enough to support a shorter cloning operation time. Even though the network bandwidth and the CPU (central processing unit) is large enough, the read speed for reading the image file from the storage disk is limited because its angular velocity at the inner tracks is low relative to the speed of the outer disk.

Some embodiments of the present invention recognize the following facts, potential problems and/or potential areas for improvement with respect to the current state of the art: (i) inefficient cloning speed is due to image file location i.e. inner tracks of a large capacity disk; (ii) conventional cloning algorithms are not aware of variations in disk track speed, resulting in inefficiency in the case of hybrid cloud environments; (iii) a typical benchmark report states that, for disk storage, the speed ratio is usually close to a 100/60 (outer partition/inner partition) ratio (that is, a disk drive that is capable of 120 MB/sec on the outer tracks might yield 72 MB/sec on the inner tracks); and/or (iv) even though the network bandwidth and the CPU resources are available, a clone operation may be limited by the disk speed (as the image file may be stored in an inner disk partition.

Some embodiments of the present invention are directed to an algorithm, or method, that facilitates an efficient cloning mechanism between the private cloud and the public cloud (e.g. on-premise object storage to off-premise computation resources) of a hybrid cloud computing environment, which, in-turn, improves the computation workloads.

According to some embodiments of the present invention, when an end user wants to clone the raw data (such as images, VM templates, unstructured data, and/or structured data) residing at inner disk tracks of on-premise storage (private cloud) to off-premise computation (public cloud), the raw data is first cloned from the inner disk tracks to the outer disk tracks of the private cloud storage and then cloned to the remote public cloud storage location. Similarly, if an end user wants to clone a set of target data from the public cloud component of a hybrid cloud computing environment to the private cloud component of the same hybrid cloud computing environment, both the importance of the target data and the potential future need of the target data by the public cloud is estimated. If it is determined that the target data is both important and that there is a potential future need for the target data, the target data is directly cloned, or otherwise written, to the outer partitioned tracks of the private cloud storage disks(s). Similarly, if the target data (e.g. processed results) is not required any more for the public cloud, the target data is directly cloned, or otherwise written, to the inner partitioned tracks of the private cloud storage disk(s). This algorithm, as-described herein, forms an efficient cloning mechanism in a hybrid cloud computing environment where the read/write speed of selected data from the storage disk(s) is selectively limited by the angular velocity of the partition where the data is stored.

Figure 6:
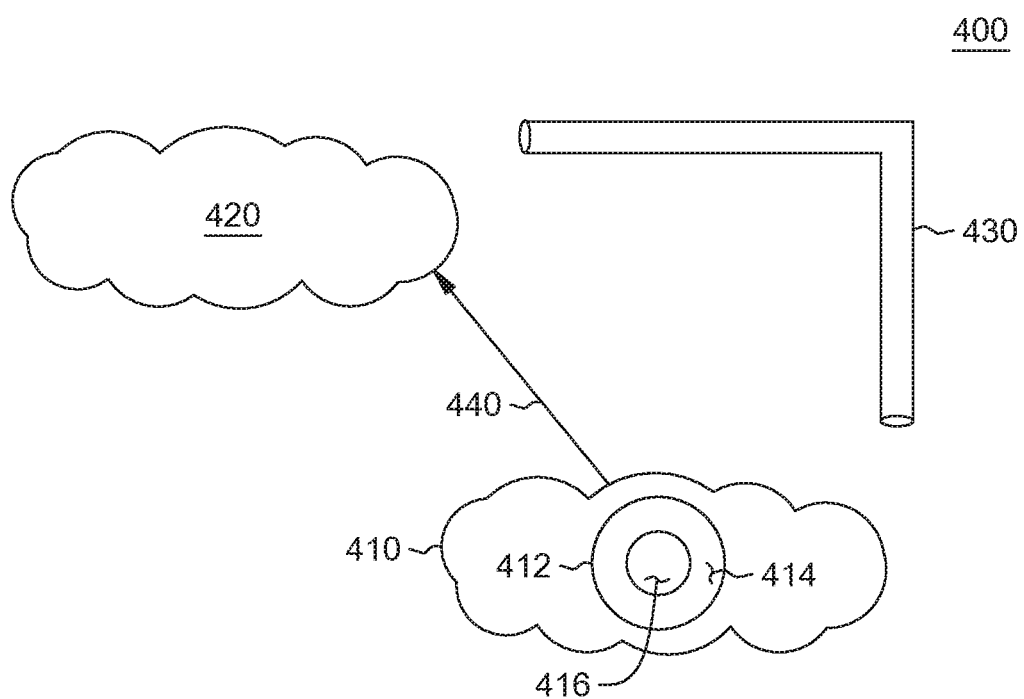
FIG. 6 depicts a second embodiment of a cloud computing environment according to some embodiments of the present invention.

FIG. 6 illustrates a second embodiment system 400 for performing clone operation 440 according to an embodiment of the present invention. The clone operation is cloning data from on-premise object storage infrastructure 410 to off-premise compute infrastructure 420 via dedicated network tunnel 430. Within the object storage infrastructure there resides storage disk 412 having outer disk partition, or track, 414 and inner disk partition, or track, 416.

Some embodiments of the present invention apply a cloning algorithm that improves clone efficiency (private cloud 410 to public cloud 420) by leveraging the speed variations in a large capacity disk environment. In one example application, the algorithm calculates the outer partition clone operation speed, where the image file is cloned to outer disk partition 414 and, then, later cloned to off-premise infrastructure 420. The outer partition clone operation speed is compared to the inner partition clone operation speed, where the image file is cloned directly from inner disk partition 416 to the off-premise infrastructure. If the outer partition clone operation speed is faster, the image files is cloned to the outer disk partition. When the clone operation is completed, either the outer partition copy or inner partition copy is deleted according to access requirements.

In another example application, an off-premise cloning engine (within off-premise infrastructure 420) chooses whether to directly clone to inner disk partition 416 or to clone to outer disk partition 414, where the image file is cloned from the inner disk partition, based on the importance of data and quality of service (QoS) required for selected tracks. The cloning operation is made more efficient when the decision is based on the QoS. For example, where the processed analytic results are determined to be of higher importance than the VM-templates, the cloning engine residing in off-premise infrastructure directly clones the analytic results file to outer disk partitions and VM-templates file to inner disk partitions.

Figure 7:
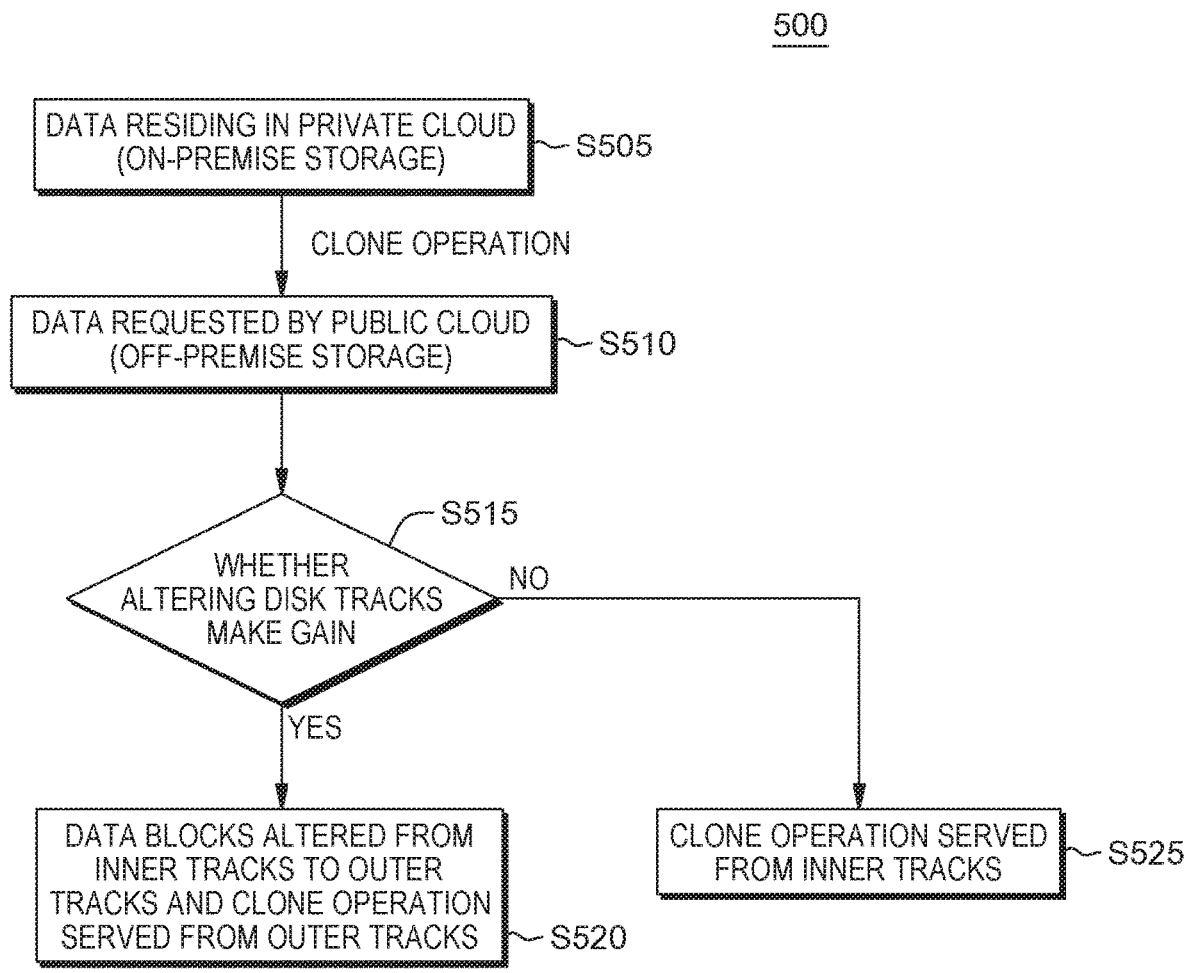
FIG. 7 is a flowchart showing a first embodiment method performed, at least in part, by the second embodiment system.
Figure 8:
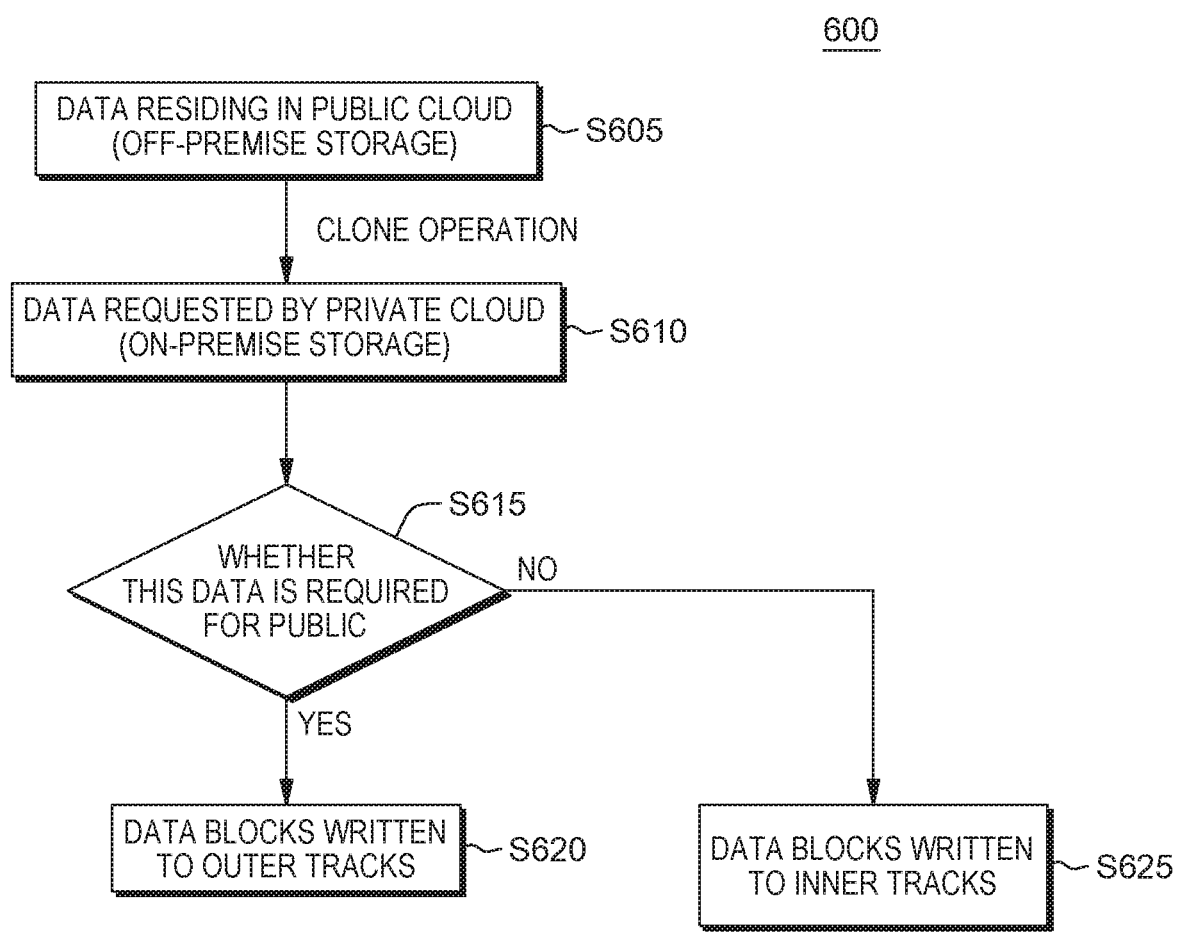
FIG. 8 is a flowchart showing a second embodiment method performed, at least in part, by the second embodiment system.

FIGS. 7 and 8 show flowcharts 500 and 600 respectively showing methods demonstrating the implementation of a cloning algorithm (cloning between private to public cloud components of a hybrid cloud computing environment) according to embodiments of the present invention. Method 500 is a clone operation from private cloud storage S505 to public cloud storage S510. Decision step S515 determines whether to perform a two-step cloning process that clones from outer tracks to the public storage (S520) or to clone from inner tracks of the disk (S525). Method 600 is a clone operation from public cloud storage S605 to private cloud storage S610. Decision step S615 determines whether certain data blocks are required for public storage. If so, selected data blocks are written to the outer tracks in private storage (S620) and, if not, selected data blocks are written to the inner tracks in private storage (S625).

Some embodiments of the present invention perform one or more of the following actions as at least a portion of a cloning algorithm according to the present invention. The cloning algorithm helps improve the clone efficiency between public and private cloud environment by leveraging the speed variations between the inner disk partition and the outer tracks of a disk: (i) identify the current track location of the requested data residing in the private cloud for clone operation by the private cloud compute environment; (ii) perform an internal alteration of blocks to outer tracks; (iii) identify the demand criteria (whether this clone based data is ready required or would be needed after some time); (iv) alter the block locations from outer tracks to inner tracks, based on the identified demand criteria; (v) estimate the importance of the data; (vi) determine which track needs to be selected for writing at the private cloud setup (if the data is important/processed results/intermittent data of the computation engine this data will be directly cloned to the outer tracks of the disk residing at the on-premise and if the data is an non important and demands a non-term storage then this data would be directly written to inner tracks of the disk residing at the off-premise); (vii) define the QoS pattern where the data content comprises of image (such as an operating system or ISO) along with separated data partition or a separate disk or volume; and/or (viii) segregate the image file with the data volume and write image file to the inner tracks, write data volume to outer tracks based on the defined QoS pattern.

Assume a clone of an image residing in the private cloud is triggered by the public cloud (i.e. data blocks of public cloud needs to be replicated with blocks of private cloud). The file system layer cloning works without knowledge of the disk track speed variations. Identify whether the requested raw data (image, VM-templates) are residing in inner tracks or outer tracks of the disks. If the requested data is residing on inner tracks, calculate the requested data size, network speed and estimate the gain in terms of total time including the clone operation and block alterations from inner track to outer track, CPU and network resources.

If the requested data size is higher than average and gain in terms of resources are higher than average, the data will be internally mapped to outer tracks and are served to public cloud from outer tracks. The status of "higher than average" is a "qualifying" status. The determination of what is "average" depends generally on a pre-determination by an organization or other decision-making authority. The basis of such a determination may be, for example, an aggressive position regarding the improvement, or optimization, of clone efficiency. Regarding a particular size or gain that qualifies for mapping to the outer tracks, the following considerations apply. The minimum image or VM templates used in production environments varies from 1-5 GB and, in a typical scenario, copying the image from the outer track to the inner track makes sense. However, doing so brings in unnecessary wastage of outer track space, disk health destruction, and so forth. While identification of the condition(s) that drive a mapping decision should be left to the various designers and/or decision-makers, one point of consideration is that if the image size is greater than that of the network bandwidth or pipe available at a particular instance of time, application timeout interval, or disk platter health the mapping decision may be as follows: (i) if the network pipe is large enough and the application timeout interval is large enough such that if the image can be read from the inner tracks, then no track position change would be made; (ii) if the network pipe is low and the application time out is strictly low, then a calculation is made as to whether it makes sense to copy the image from the inner tracks to the outer tracks; and (iii) if the network pipe is low and the application timeout is low, but the disk platter health of the outer track is bad, or predicated to be prone to failure, when compared with the inner track, then the image is not moved.

If the data is already existing in the private cloud and a clone operation of same data is requested by the public cloud to private cloud. In this scenario estimate the demand (i.e. whether this clone based data is ready required or would be needed after some time), based on this identified demand criteria alter the block locations from outer tracks to inner tracks.

If the data clone operation is triggered by the private cloud to the data residing in the public cloud, estimate the importance of the data and based on it decide which track needs to be selected for writing at the private cloud setup (i.e. if the data is important/processed results/intermittent data of the computation engine this data will be directly cloned to the outer tracks of the disk residing at the on-premise and if the data is an non important and demands a non-term storage then this data would be directly written to inner tracks of the disk residing at the off-premise).

If the data content comprises of image (such as operating system and ISO) along with separated data partition or a separate disk or volume. In this case based on the QoS pattern defined, segregate the image file with the data volume and write image file to the inner tracks, write data volume to outer tracks.

Some embodiments of the present invention are directed to hybrid flash storage technology, also referred to as an SSHD device, where NAND flash solid-state drive (SSD) is combined with hard disk drive (HDD) technology. In hybrid flash storage technology, the initial write occurs on the SSD and, later, the write is transferred to the HDD. Accordingly, the driver that reads the SSD and writes to HDD selects between the outer tracks and the inner tracks of the HDD based on factors including: (i) calculation of the target data size; (ii) determination of the network speed; and (iii) the gain is calculated in terms of total time for the clone operation, the block location alteration(s), CPU (central processing unit) resource(s), and network resource(s), as discussed above.

Some embodiments of the present invention are directed to mixed media, where the disk technology is identified (such as LMR (longitudinal magnetic recording), PMR (perpendicular magnetic recording), and SMR technology) and, based on identified technology, the angular velocity gap is estimated to support a determination whether to write to the outer tracks and the inner tracks of the storage disk.

Some embodiments of the present invention may include one, or more, of the following features, characteristics and/or advantages: (i) ability to clone data from outer sector of a disk to inner sector of other disk; (ii) ability to identify the sector and based on it clone to outer sector and then later to requested clone party; (iii) ability to clone from one disk sector to other disk sector based on importance of the data and its necessity in future; (iv) if clone operation is initiated for data residing at inner disk tracks of private to public cloud (the data would be first cloned from inner disk tracks to the outer disk tracks of private cloud and then later on would be cloned to the public cloud); and/or (v) if the clone operation is initiated for data from public to private cloud, the importance of the data and its necessity in future for the public cloud is estimated and based on the predication, the data is directly cloned to inner tracks or outer tracks of the private cloud disks.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer program product for improving the clone efficiency in a hybrid cloud environment between a corresponding public cloud environment and a corresponding private cloud environment by leveraging the speed variations between an inner partitioned set of tracks of a storage disk and an outer partitioned set of tracks of the storage disk stored in the public cloud environment, the computer program product comprising a computer readable storage medium having stored thereon:

first program instructions programmed to receive a request for a clone operation for a target data from the private cloud environment, the target data located in the public cloud environment where the public cloud environment provides the storage disk for a processing operation performed by the hybrid cloud computing environment;

second program instructions programmed to estimate an importance level of the target data by determining at least whether the target data includes intermittent data to be used by the compute resource for the processing operation of the private cloud environment where the private cloud environment provides the compute resource for the processing operation performed by the hybrid cloud computing environment; and third program instructions programmed to determine whether to write the target data to the inner partitioned set of tracks or to the outer partitioned set of tracks of the storage disk based, at least in part, on the importance level of the target data with respect to the processing operation.

2. The computer program product of claim 1, wherein:
the importance level is high if the target data includes the intermittent data to be used by the computing component.

3. The computer program product of claim 1, wherein the determining whether to write the target data to the inner partitioned set of tracks or to the outer partitioned set of tracks of the storage disk is further based on a first importance level and a second importance level, the first importance level triggering the target data to be written to the outer partitioned set of tracks on the storage disk, the second importance level triggering the target data to be written to the inner partitioned set of tracks on the storage disk.

4. The computer program product of claim 3, further comprising:

fourth program instructions programmed to determine contents of the target data;

wherein:

the contents of the target data include an operating system image and a separated data volume.

5. The computer program product of claim 4, further comprising:

fifth program instructions programmed to segregate the operating system image according to the second importance level such that the operating system image is segregated to the inner partitioned set of tracks; and sixth program instructions programmed to segregate the separated data volume according to the first importance level such that the separated data volume is segregated to the outer partitioned set of tracks.

6. A computer system for improving the clone efficiency in a hybrid cloud environment between a corresponding public cloud environment and a corresponding private cloud environment by leveraging the speed variations between an inner partitioned set of tracks of a storage disk and an outer partitioned set of tracks of the storage disk stored in the public cloud environment, the computer system comprising:

a processor set; and a computer readable storage medium;

wherein:

the processor set is structured, located, connected and/or programmed to run program instructions stored on the computer readable storage medium; and the program instructions including:

first program instructions programmed to receive a request for a clone operation for a target data from the private cloud environment, the target data located in the public cloud environment where the public cloud environment provides the storage disk for a processing operation performed by the hybrid cloud computing environment;

second program instructions programmed to estimate an importance level of the target data by determining at least whether the target data includes intermittent data to be used by the compute resource for the processing operation of the private cloud environment where the private cloud environment provides the compute resource for the processing operation performed by the hybrid cloud computing environment; and third program instructions programmed to determine whether to write the target data to the inner partitioned set of tracks or to the outer partitioned set of tracks of the storage disk based, at least in part, on the importance level of the target data with respect to the processing operation.

7. The computer system of claim 6, wherein:
the importance level is high if the target data includes the intermittent data to be used by the computing component.

8. The computer system of claim 6, wherein the determining whether to write the target data to the inner partitioned set of tracks or to the outer partitioned set of tracks of the storage disk is further based on a first importance level and a second importance level, the first importance level triggering the target data to be written to the outer partitioned set of tracks on the storage disk, the second importance level triggering the target data to be written to the inner partitioned set of tracks on the storage disk.

9. The computer system of claim 8, further comprising:
fourth program instructions programmed to determine contents of the target data;
wherein:
the contents of the target data include an operating system image and a separated data volume.

10. The computer system of claim 9, further comprising:
fifth program instructions programmed to segregate the operating system image according to the second importance level such that the operating system image is segregated to the inner partitioned set of tracks; and
sixth program instructions programmed to segregate the separated data volume according to the first importance level such that the separated data volume is segregated to the outer partitioned set of tracks.

* * * * *